Jan. 31, 1933.  D. A. HALL  1,895,458
AIRCRAFT
Filed Aug. 9, 1929  2 Sheets-Sheet 2

INVENTOR
DONALD A. HALL
BY
ATTORNEY

Patented Jan. 31, 1933

1,895,458

UNITED STATES PATENT OFFICE

DONALD A. HALL, OF SAN DIEGO, CALIFORNIA

AIRCRAFT                        REISSUED

Application filed August 9, 1929. Serial No. 384,592.

The present invention relates to aircraft constructions, and, in particular, to an aircraft, heavier-than-air aircraft, flying machine, airplane, and glider construction by which it is possible to maintain absolute stability in the aircraft irrespective of all external conditions tending to produce an unstable condition of the aircraft, as will hereinafter be more particularly shown, set forth, and described. For convenience of terminology the term "airplane" is used throughout these specifications to include broadly all types of aircraft.

According to the prior art, so far as I am aware, it has been customary to build and design airplanes of either the monoplane or biplane type with a wing, or wings, in the front of the plane, and a small horizontal tail, consisting of a fixed stabilizer and a trailing elevator, in the rear thereof. With such a type airplane longitudinal maneuvers are retarded by the stabilizer.

When designed with proper stability the horizontal tail, in the type of construction above named using the ordinary unstable wing, has a negative or downward air load acting, and the center of gravity is, therefore, forward of the center of pressure of the wing air lift at the normal cruising speed of the airplane. The center of pressure motion fore and aft along a longitudinal direction of the ordinary wing is unstable, that is, it moves forward with an increase in the angle of attack and moves aft with a reduction or decrease in the angle of attack. Therefore, such a construction will not meet the requirements of a stable wing, which means a wing that has the center of pressure motion in the reverse direction from the above, and thus opposes the change in the angle of attack. According to experimentation it has been found quite suitable to locate the center of gravity at a point at about 30% of the wing chord from the leading edge, thus giving longitudinal stability.

In closed cabin airplanes most of the cabin space is aft of the center of gravity and the baggage compartment is usually located aft of the cabin. Under such conditions the airplane is built and designed so as to be balanced properly with a full load of passengers and a small amount of baggage per passenger, which is usually from fifteen to thirty pounds per passenger. In commercial operation, and particularly with privately owned airplanes, a full hundred percent overload in baggage often occurs, and this moves the center of gravity sufficiently far aft to affect seriously the longitudinal stability.

From experiments conducted by the U. S. Army Air Corps and other organizations it has been shown that with the center of gravity too far aft, about 35% of the wing chord from the leading edge, many airplanes, if forced, will get into a flat tail spin from which it is generally impossible to recover. Such tests readily show that it is extremely important to keep the center of gravity location in reference to the wing well within predetermined limits, which, in turn, automatically limits the size of the cabin space in a passenger airplane, inasmuch as the engine is in front in the space just forward of the wing or wings.

In the type of construction above described the elevator trails behind the stabilizer, as a rudder behind a boat. When the elevator is displaced in either direction, that is, either upwardly or downwardly, it creates an opposing force upon the control stick by which the pilot controls the plane. If an overload of baggage or passengers is placed behind the center of gravity the portion acting on the horizontal tail is taken care of by pushing forward on the control stick to such an extent as is necessary to resist the steady acting force. This lowers the elevators and creates a lift to compensate for the uneven loading.

It is very tiresome for a pilot to constantly resist a steady force on the control stick, and, therefore, to alleviate this load most airplanes now have the stabilizer adjustable through a small angle from the cockpit. Thus, for an ordinary center of gravity variation the airplane can be balanced to secure zero resisting load on the control stick, or, in other words, a neutral elevator position. In maneuvering, the pilot is, however, resisted by a force on the control stick, the value varying in proportion to the angular rate of turn.

It has also been known in the prior art to build airplanes of the "tandem" type, but such construction, while provided with a plurality of wings located one in front of the other and at substantially the same level, nevertheless has both wings rigidly fixed, and the usual type of elevator is, therefore, arranged along the trailing edge of the rear of the two wings. Such a construction allows only sluggish longitudinal maneuverability.

Also, it has been known in the prior art that airplanes have been constructed in which the center of gravity has been located in the usual position, while providing the airplane with a small longitudinal continuous horizontal tail surface of approximately the same size as the tail portion of the usual airplane. In such a case the single tail surface operated on a lateral axis at the normal center of pressure, but this portion was not characterized with a substantially neutrally stable center of pressure. Such a small tail type airplane can have reasonably good stability and maneuverability combined, as compared to the usual type airplane now known, but this airplane requires the passengers and/or load to be carried forward, as usual, and with little shifting of the load permissible, without greatly changing the longitudinal stability.

Therefore, as a primary object of the present invention I have sought to develop an airplane construction in which the stability of the airplane is greatly increased, irrespective of load conditions.

A further object of my invention is to provide an airplane construction in which the increased stability may be had without any sacrifice in the ease of maneuverability.

A further object of my invention is to provide an airplane construction in which the center of gravity may be much further aft than has heretofore been possible with the usual airplane.

A still further object of my present invention is to provide an airplane construction in which there may be an extreme variation in the number of passengers, that is, full or empty, in the case of cabin airplanes of the commercial type, or movement of the passengers carried or other variations in loading without losing the stability or balance of the airplane.

A further object of my invention is to provide an airplane construction in which there is a high inherent stability and ease of maneuverability to any desired degree, that is, the maximum maneuverability can be limited by adjustment of construction on the ground or in the air.

Still further objects of the present invention are to provide an airplane construction with means by which the landing speed may be substantially decreased; to provide for safer landing conditions; to provide for increased visibility both during flight and upon landing; and, to provide an air plane capable of landing upon uneven ground without danger of "rolling over."

A still further object of my invention is to provide an airplane construction with means by which the landing run is reduced to a small fraction of that of the present best airplanes under similar conditions.

Still a further object of my invention is to provide an airplane construction by which it is possible to increase the carrying capacity of the airplane by increasing the length of the cabin space in a commercial type passenger airplane, for example, to a substantial degree without affecting the stability of the airplane or the ease of control.

As a further object of my invention I have sought to provide an airplane construction in which the size of the main wing can be reduced to a material extent by the provision of what I have termed a "lifting tail."

A still further object of my invention is to provide for increased ease of control along the longitudinal axis.

A still further object of the present invention is to provide an airplane construction which is unable to "take off" from the ground while in a stalling attitude, and thereby eliminate one of the common dangers in airplane flight, for example, engine failure while close to a stall position near the ground.

Still a further object of my invention is to provide an airplane construction in which the angle of climb attainable is considerably increased and the doubts as to the ability of the airplane to clear objects on the ground upon taking off are correspondingly decreased.

Still a further object of my invention is to provide an airplane construction which will maintain stability and balance during flight conditions automatically and without any control action whatever on behalf of the pilot, and irrespective of the speed at which the plane is flying or of the location of the loads carried.

A still further object of my invention is to provide an airplane construction of such a nature and type that the airplane cannot "spin" accidentally while in any flying condition.

Still a further object of my invention is to provide an airplane construction in which the control thereof is accomplished through a control of a pivotal wing and a movement thereof by any desired amounts about an axis extending laterally therethrough.

A still further object of my invention is to provide an ariplane construction which has the unique combination of exceptional longitudinal stability and a maximum of longitudinal controllability and maneuverability.

Other objects of my invention are to provide an airplane construction in which the span of the wings is materially decreased without any loss in lifting power or loading; to provide for safety in operation; to provide for minimum construction expenses; to provide for simplicity of operation; to provide for a high overall efficiency throughout the construction; and to provide an airplane construction which is ideally suited to the training of new pilots.

Still other and ancillary objects of my present invention will at once become apparent and suggest themselves to those skilled in the art to which the invention relates from a reading of the following specification and claims in connection with the accompanying drawings forming a part of my present disclosure.

Figure 1:
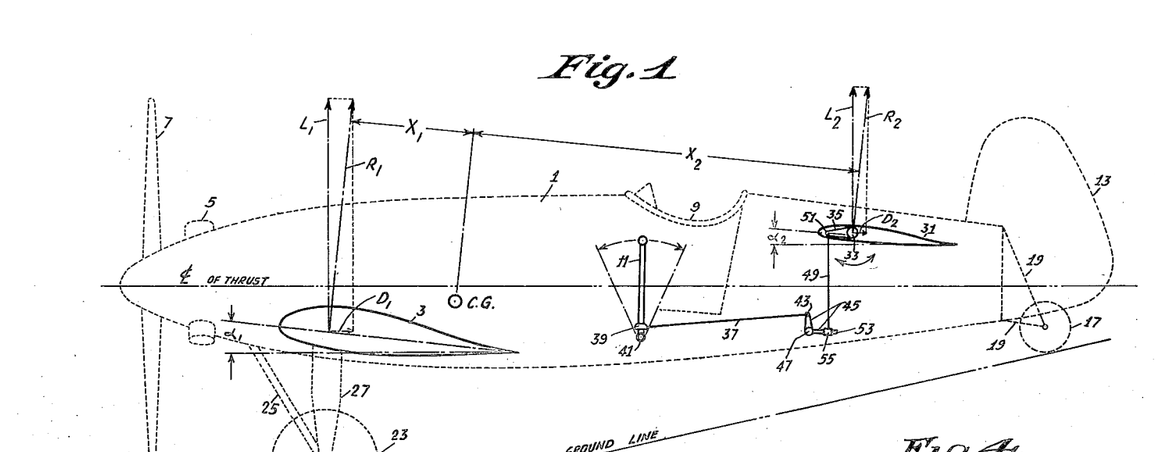
Fig. 1 illustrates a longitudinal view, partly in section, of a preferred embodiment of my invention.

First, to refer in particular to Fig. 1 of the drawings, I have shown the airplane as being formed from the usual fuselage or body 1, and have arranged in the front thereof a single main or forward wing 3 positioned preferably on the lower portion of the fuselage. The fuselage or body 1 may be, where desired, of a more or less conventional type and formed of steel tubular members, duralumin, wood, or other suitable material, and covered in any suitable and desired manner.

By positioning the main wing 3 on the lower portion of the fuselage 1 the pilot or observer is able to obtain a much better vision while flying than is obtainable with the wing on the upper part of the fuselage, since in the latter case the wing may extend in the direct line of vision of the pilot and is, therefore, objectionable during flight, as well as in taking off and in landing.

Forward of the main wing 3, and in the nose of the fuselage or body 1, I have arranged a space for the engine, which is conventionally illustrated by the numeral 5, and by this engine the usual propeller 7 is revolved.

To the rear of the main wing 3 I have arranged the cockpit 9 in which the pilot's space is located, or, if desired, I may change the position of the pilot to above the leading edge of the main wing 3 and thus provide most of the space in the fuselage for cabin space so that the airplane is adapted to commercial operation and suited for carrying a large number of passengers, depending, of course, as to the number of passengers carried upon the relative area of the main lifting wing, the size of the engine provided, the length of the fuselage, and other factors which are always necessary to be considered in determining the size of an airplane.

As shown by the drawings the pilot's cockpit 9 is located toward the rear of the fuselage or body 1 and in this cockpit there is provided the usual control stick 11 for enabling the pilot to control the airplane in its longitudinal movement in the manner to be hereinafter described and set forth in detail.

At the tail end of the fuselage 1, I have provided the rudder 13 which is controlled by the usual rudder bar, or any other convenient and known means, so that the turning radius of the airplane about a vertical axis through the center of gravity may be varied at will.

For supporting the rear end of the airplane when it is resting upon the ground, and also to provide a third support point upon landing, I have provided a tail wheel 17 which may be supported from the rear end of the fuselage or other suitable location by any convenient means such as the struts 19.

At the forward end of the airplane I have provided a landing gear mechanism, generally designated 21, consisting of a pair of widely separated wheels 23, for example, with a tread equal to 25% to 35% of the wing span, which are braced and supported by means of struts 25 and 27, which are supported by the wings in any desired manner.

In a forced landing, such as in a small field, for example, the airplane can be ground looped just after touching the ground, thus stopping it almost instantly without danger of rolling over on one wing tip. A ground loop is a maneuver with the airplane, due to the exceptionally wide tread and the large elevator wing in combination.

To the rear of the fuselage, it will be noted that there is a total absence of any stabilizer or fin, but in place of the usual stabilizer and trailing elevator I have provided what I have termed a large longitudinally continuous "controllable wing" or small elevating surface 31. The controllable wing 31 is preferably pivoted and movable about a torque shaft or lateral axis 33 in the directions designated by the arrows. This controllable wing 31 serves also as an elevator wing, as will hereinafter become more apparent.

Rigidly fixed upon the torque shaft 33 extending laterally through the rear of the fuselage 1 is a lever 35 which is controlled from the control stick 11 provided for the pilot through a series of connecting rods and bell crank levers. The connecting rod 37 is supported at the lower end of the control stick 11 at a point 39 slightly above the point 41, where the control stick is supported on the fuselage, so as to be capable of movement back and forth in a longitudinal direction of the fuselage, as shown by the arrows. To the rear of the connecting rod 37 there is a pivotal connection at a point 43, for example, to the bell crank lever 45 pivoted at 47 to the fuselage so that movement of the connecting rod in the direction shown by the arrows adjacent to the same will cause the bell crank lever 45 to rock about the shaft 47 as a pivot point.

I have connected the lever arm 35, attached to the torque shaft 33, for the purpose of moving the control wing 31 about the torque shaft 33 as a pivot point, to still another connecting rod 49 attached to the lever arm 35 pivotally at a point 51, and at the lower end of the connecting rod 49 is connected to the portion 53 of the bell crank lever 45 at a point designated 55.

I have termed the point 55 a point of differential connection, since by means of varying the location of the point 55 on the bell crank lever 45, either toward its outer end 53 or toward the point of support thereof 47, the ratio of movement imparted to the control wing 31 through a definite and predetermined movement of the control stick 11 may be varied at will.

The controllable wing when moved to a negative angle of attack gives both a large downward air load and a large air resistance. The air resistance acts effectively as an air brake in slowing the airplane down after it touches the ground.

After touching the ground in landing the controllable wing is moved to a large negative angle of attack, and the large downward air load, which when added to the dead weight of the airplane, forces the tail wheel 17 hard against the ground, makes its braking action extremely effective. The dead weight of the airplane alone on the tail wheel 17, even if the control wing is reduced only to an angle giving no lift, gives an exceptional braking action on the ground. The wheel brakes (forward or tail wheel) of the usual airplane are useless for a period after the airplane touches the ground in landing, since the weight of the airplane is still being carried by the wing. After a considerable landing run the wing loses sufficient lift so that the wheel brakes start to become effective. Due to the horizontal tail on the usual airplane being so small, and with such a small dead weight at the tail, a tail wheel brake has practically no value.

According to the present disclosure, an accidental ground loop is stopped instantly by reducing the angle of the control wing, the force on the tail wheel and its braking action on the ground holding the tail of the airplane to a straight course.

To refer now more particularly to the operation of the airplane, it will be noted that at the designed cruising speed of the airplane, the center line of the propeller thrust imparted from the rotation of the propeller 7 is in the direction of the line of flight. The forward wing or main wing 3 is set at an angle of incidence of $\alpha_1$ to the center line thrust and has a resultant air load of $R_1$; a lift load $L_1$; and, a drag or resistance load of $D_1$. The aft or control wing 31 is placed or set at an angle of incidence of $\alpha_2$ to the center line thrust and has a resultant air load indicated by $R_2$; a lift load indicated by $L_2$; and, a drag or resistance load indicated by $D_2$, following the notations set forth as to the main wing 3. The combined total lift of the two wings 3 and 31 perpendicular to the line of flight and equal to the gross weight of the airplane, including its contents, is then equal to $L_1+L_2$. If now the center of gravity of the entire plane be represented, as shown, by the letters C. G. and if $X_1$ indicates the distance between the resultant load and a line drawn parallel thereto through the center of gravity of the plane, and if $X_2$ indicates the distance from the resultant load $R_2$ to the line drawn parallel thereto through the center of gravity, then it will be seen that $R_1X_1=R_2X_2$.

At the designed cruising speed, $\alpha_2$ is less than $\alpha_1$ and at all speeds the angle of attack of the aft wing 31 is less than that of the forward wing 3 in order to maintain the proper stability. The value of $\alpha_2$ is proportional to the value of the stability of the forward wing while maintaining the same longitudinal stability of the entire airplane. It is an advantage to have the angle $\alpha_2$ as large as possible so as to increase the load carried by the aft or control wing 31.

By pulling the control stick 11 back toward the rear of the plane by a small amount, the angle $\alpha_2$ of the control wing is reduced and also the lift provided thereby is reduced, so that the angle of attack of the airplane, and incidentally both wings, is increased. This of course means that the reduction of load on the tail or aft wing 31 forces the airplane in position of increased angle and the increase in the angle of attack of the center line of thrust of the airplane overbalances the reduction in the angle $\alpha_2$ of the control wing. Without touching the engine throttle (not shown) so as to increase the speed thereof, the increased angle of attack and thereby the wing lift causes the airplane to change its angle of flight to climbing flight. The air speed is then reduced due to the increased wing drag or resistance of the larger angle of attack. By pulling the stick 11 back and reducing the engine throttle to the proper amount, level flight is maintained with a corresponding reduction in air speed.

Figures 5, 6:
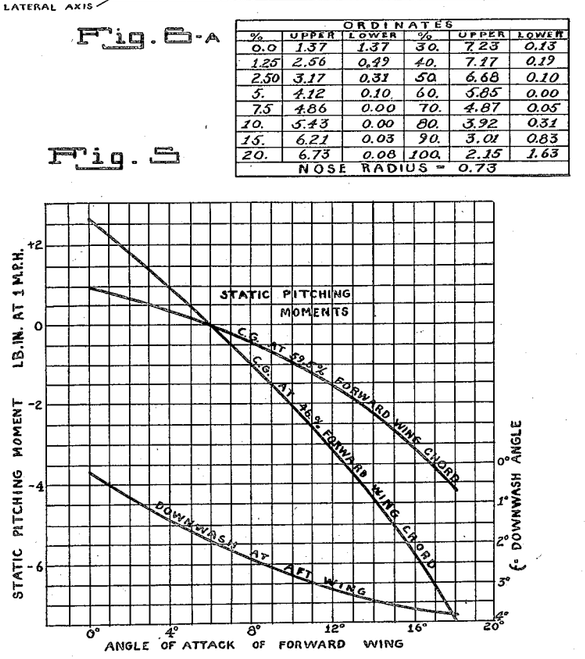
Fig. 5 illustrates the static pitching moment curves of a tandem wing combination with the forward wing low and the aft wing high.
Fig. 6 illustrates the Hall neutrally stable airfoil section with its ordinates; and, Fig. 6A is a chart of the ordinates of Fig. 6.
Figure 6:
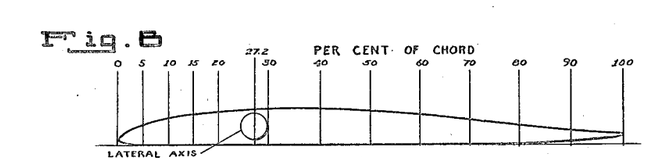

The stability curves, as shown by Fig. 5, were calculated using the downwash angles of the airflow over the aft wing and with the aft wing having an area of 32% of that of the forward wing. The forward wing is composed of stable airfoil sections of various camber ratios with characteristics similar to the N. A. C. A. M.—6 airfoil section. With the center of gravity at 46% of the forward wing chord aft of its leading edge, the aft wing has a unit lift loading of 34% of that on the forward wing. With the center of gravity at 59.5% of the chord, the longitudinal stability, as shown by the pitching moment curves, is less but ample and the unit lift loading on the aft wing is much greater at 55% of that on the forward wing. The static longitudinal stability of this combination is due to the relative position of the two wings, the relative angles of attack, and to the stable forward wing.

The usual airfoil or wing sections (cross section in line of flight) is unstable in that an increase in the angle of attack moves the center of pressure of the lift forward and thus tends to increase the angle of attack all the more and with a reduction in the angle of attack the reverse is likewise true. It is known that certain airfoils are stable due to an up-trend on the trailing edge and thus an increase in the angle of attack is resisted by an aft movement of the center of pressure, and it is, therefore, possible to design an airfoil that is neutrally stable with no motion of the center of pressure. A substantially neutrally stable airfoil for the aft control wing or elevating surface pivoted substantially at its neutral center of pressure, as at 33, puts no resisting force on the control stick and thus makes it very easy to operate. It is desirable, however, in extreme attitudes of flight, especially near or above the maximum speed, that a resisting force be acting upon the control stick from the control wing, so that in letting the stick free, when in a dive, it will, of itself, attain a normal position and thus bring the airplane back to a normal attitude of flight.

An airfoil can be designed with a neutrally stable center of pressure motion within angles of attack corresponding to the ordinary flight speed range, and slightly unstable at approximately the angle of attack corresponding to the maximum speed and higher. Pushing the control stick 11 forward at approximately the maximum speed, the unstable center of pressure has moved aft of the torque shaft, thus resisting the increase in the angle of incidence (reduction in angle of attack of the controllable wing which, in turn, causes a resisting force to act on the control stick.

A preferred form of neutrally stable airfoil section with its ordinates has been illustrated by Fig. 6. By this showing the lateral axis 33 is located at 27.2% of the chord aft of the leading edge, where the moments of both the air forces and the structural weight of the controllable wing are balanced in the normal range of cruising speeds in order to produce no return load in the pilot's control stick. The lateral axis need not be located between the upper and lower surfaces of the airfoil, but may be located a considerable distance below it, or even above it. The airfoil section shown by Fig. 6 is only one of an infinite number of sections that can be designed as neutrally stable in varying degrees of neutral stability by a person thoroughly familiar with this phase of aerodynamics.

With a thorough knowledge of aerodynamics, a neutrally stable airfoil surface can be designed having a combination of sweepback and an angle of incidence varying progressively from a maximum at the root or middle section to a minimum at the airfoil tips. A tapered airfoil surface with the trailing edge straight and the leading edge inclined rearward toward the tips suffices for a sweepback. The lateral axis would be a straight line located substantially at the neutral center of pressure of the entire airfoil surface.

If now an overload capacity be added considerably behind the center of gravity the additional lift required by the aft control wing is automatically added by pushing the control stick 11 forward without the pilot realizing it, due to the lack of the resisting force. The neutral position of the control stick is changed only slightly and the airplane is capable of maintaining actual flight with "hands off" the control stick at all ordinary flying speeds, due to the stability combined with the no load feature on the stick, as described.

There are several distinct features of advantage to be gained through the use of a large aft control wing of the type shown, for example, by the numeral 31, in that, since the area of the control wing is several times that of the controlling surface of the ordinary airplane, the pilot is able to pull the plane out of a dive resulting from a forced stall in a much shorter distance than usual. The large elevator control eliminates any chance of the airplane "nosing over" on a muddy field, for example. Due to the large area of the control wing 31 the tail of the airplane is lifted off the ground in an extremely short distance on a take-off. Attempts to stall the airplane off the ground before sufficient flying speed is reached proved futile. This is due principally to the loss of considerable lift on the elevator wing in suddenly pulling back on the control stick 11. This is an especially good feature in an airplane in that inability to take off from the ground while in a stalling attitude eliminates one of the most common dangers in connection with airplane flights, mainly that of failure of the engine while close to a stall on a take-off.

If now it is supposed that the airplane is put into a dive with the engine either on or off, then by letting go of the control stick 11, the airplane will immediately start to level itself and attain a normal attitude of flight. If while in a climb, irrespective of how steep the climb may be, the engine is cut off, without touching the control stick 11 the airplane will gently nose down and enter into a normal glide. An airplane of the type hereinabove described will not accidentally stall, but if forcibly stalled the airplane will go into a moderate dive and without touching the control stick it will recover itself after a short period of time and once more attain a normal attitude of flight.

As is known to those familiar with aerodynamics, the lift curve of the ordinary airfoil section (both unstable and stable) has the property when the angle of attack is sufficiently great, to break or drop off suddenly. The point of drop in the lift is called the "burble point" and is the point when the airfoil stalls due to a sudden development of air turbulence over the top surface.

There has been some little success in developing special airfoil sections that do not burble suddenly by designing them with a flat burble point.

The controllable wing airplane, as above described, cannot be accidentally stalled, but can be forcibly stalled because the airfoil sections used in the forward wing burbles suddenly.

Certain combinations of airfoil sections, varied angles of incidence along the span, and certain biplane combinations produce a "flat burble point" which when replacing the forward wing according to the present invention will make the airplane completely non-stalling, namely:—

Case (A)—The angle of incidence varied from a maximum at the wing root (next to the body) to a minimum at the wing tip, with a difference of approximately four (4) or more degrees, depending upon design and tests. The section of the wing at the root will burble and stall first and the wing tip later due to the smaller angle of incidence. This flattens out the burble point and if of a proper amount will prevent stalling of the wing and of the airplane. With the angle of incidence at least four (4) degrees less at the wing tips, while the root section stalls, full aileron control will be had, thus preventing one side of the wing from falling off or stalling. This non-stalling wing with full aileron control combined with the unsurpassed elevator wing control gives results which, so far as applicant is aware, have not previously been attained in an airplane. Sweepback added to the above varied angles of incidence adds stability to the wing longitudinally. With a sufficient sweepback the wing will be sufficiently stable so that the airfoil sections can be any ordinary unstable types instead of a stable type, when used in combination with the controllable elevator wing.

Figure 4:
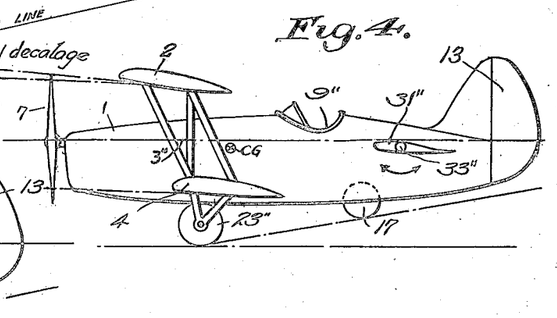
Fig. 4 illustrates a still further modification of the invention wherein the controllable wing is used in combination with a biplane type main wing unit.

Case (B)—Fig. 4 shows another method to secure a flat burble point is by having the fixed wing unit composed of a staggered decalage combination of approximately 50% or more positive or negative stagger with the leading wing at approximately three (3) degrees or more greater angle of incidence than the other wing. The leading wing burbles first, thus flattening out the burble point in practically the same way as in varied angles of incidence wing. Also, the staggered decalage combination, as indicated, is stable, which allows the use of ordinary type unstable airfoil sections, when in combination with the controllable elevator wing.

Figure 2:
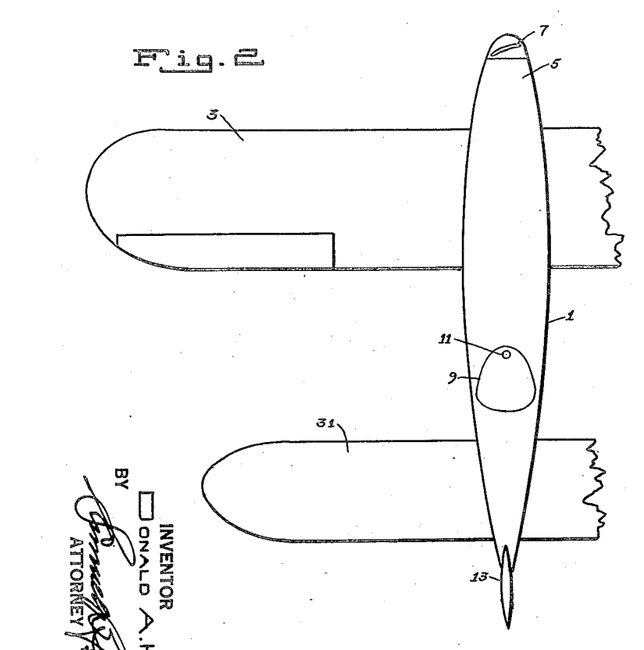
Fig. 2 illustrates a partial top plan view of the construction shown by Fig. 1.

The airplane, as described in connection with Figs. 1 and 2, has a fixed main wing unit with a stable center of pressure movement and a neutrally stable controllable elevator wing. The elevator wing in order to be of value as a lifting surface should have a range of span ratio of approximately ⅓ to one of equal size. With a small ratio the unit lift loading of the elevator wing is much smaller than with larger sizes, in order to maintain longitudinal stability.

With the controllable aft wing of sufficient relative size, the airplane can be designed with a fixed wing unit of the unstable type, yet having inherent longitudinal stability.

A small aft substantially neutrally stable longitudinally continuous control airfoil or control surface equal in size to the combined areas of the stabilizer and elevator of the usual airplane in combination with a forward wing gives static longitudinal stability when (a) the forward wing is stable and the center of gravity of the airplane is located in such a position that there is little or no lifting force on the control airfoil; (b) the forward is of the usual unstable type and the center of gravity of the airplane is located sufficiently forward that there is produced a negative lifting force on the control airfoil of the required amount.

From the above it is seen that, other conditions being equal (a) the controllable wing aft can carry more lift with a stable fixed wing than with an unstable one; (b) a larger controllable aft wing increases the longitudinal stability; and (c) increasing the stability of the fixed wing increases the load that can be carried by the controllable aft wing.

Figure 3:
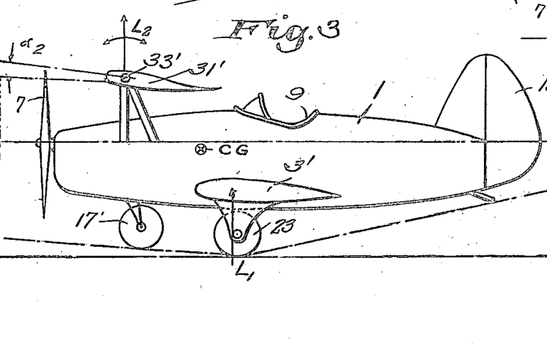
Fig. 3 illustrates a modification of my invention wherein the controllable wing is mounted on the forward portion of the fuselage or body member and the main wing unit is positioned aft thereof.

Now making reference to Fig. 3 of the drawings, it will be seen that the principles of the invention may be practiced by locating the controllable wing 31' forward on the fuselage 1 and main wing unit 3' aft thereof. According to the description of the invention as applied to the aft controllable wing 31 (see Fig. 1) and its rotation about the shaft 33, the forward controllable wing 31' may be controlled similarly by a rotation about a lateral axis 33'. In this arrangement an increase in incidence increases the angle of attack of the controllable wing, thus producing a stalling moment which, in turn, increases the angle of attack of the airplane, the center of gravity being located such that the angle of attack of the aft wing unit is less than the forward controllable wing. In order that longitudinal stability and balance is maintained the controllable wing has a substantially neutrally stable center of pressure with the axis of angular movement located substantially within the zone of neutral stability. The aft fixed wing unit may have either stable or unstable airfoil sections, depending upon the location of the center of gravity. When the center of gravity is moved aftward the stability of the fixed wing unit should be increased, while when the center of gravity is moved forward the fixed wing unit may be less stable, if desired. The wings are preferably arranged close together in order that the vertical tail is sufficiently far aft that directional stability and control, as in a weather vane, may be produced.

The arrangement of Fig. 4 represents a modification of the type of construction shown by Fig. 1, and applies the principles set forth by the showing and description of Fig. 1 to an airplane of the biplane type. By Fig. 4 the main wing unit 3'' is located on the forward part of the fuselage 1 and consists of a pair of fixed wings 2 and 4 arranged in the form of the well known staggered decalage biplane. The controllable elevator wing 31'' is arranged aft on the fuselage 1 and is adapted to be pivoted about the torque shaft 33'' in a manner similar to that described for the monoplane of Fig. 1. The operation of the controllable wing and its cooperation with the main wing unit is identical to that of the arrangement of Fig. 1 and the cooperation of the controllable wing 31 with the monoplane wing unit 3.

From the above description, it will readily be apparent that I may make many modifications of the design hereinabove suggested and while I have shown and described my invention as applied principally to the monoplane type airplane, wherein there is a single main or lifting wing located on the forward part of the fuselage and a controllable wing unit located to the rear of the fuselage, it will be apparent that I may replace the single forward or lifting wing by a pair of main wings arranged one above the other, or so arranged that the upper of the two wings slightly leads the lower of the two forward main wings, and then apply the principle herein disclosed to the usual type of biplane or to a staggered decalage biplane, respectively. In order to designate broadly all such types of wing structure the term "wing unit" is used herein, and throughout the claims, as a term generic to all types of wing arrangements, irrespective of whether the airplane is of the monoplane, biplane, staggered biplane, triplane, or other known type.

It is also within the scope of my invention and present disclosure to provide an airplane construction wherein the main wing provided in the airplane structure is arranged to the rear of the fuselage and the controllable wing is arranged forward on the fuselage so that the controllable wing leads the main wing. As above described in connection with the main wing located forward of the controlled movable wing, here also I may substitute for the main wing the usual type of biplane wing wherein each of the two wings is arranged directly above the other, or I may substitute a staggered biplane wing arrangement for the single lifting wing.

Still other modifications of my invention will become apparent and at once suggest themselves to those skilled in the art to which my invention relates, and I, therefore, believe myself to be limited as to what modifications and changes I may make in the invention herein disclosed only insofar as the spirit and scope of the hereinafter appended claims necessitates.

Having now described my invention, what I claim and desire to secure by Letters Patent is the following:—

1. In an airplane construction, a body, a fixed wing unit located forward on said body, said wing unit having a stable center of pressure motion of air lift and having the angle of incidence reducing from a maximum at the body to a minimum at the wing tips, a controllable wing located aft on said body, means for pivoting said aft located wing about an axis located at the normal center of pressure of said wing, said aft wing being arranged with a neutrally stable center of pressure motion within a relatively small range of the normal angle of attack and an unstable center of pressure motion at extreme angles of attack, means for controlling the motion of said pivoted aft wing about said axis thereof, and means provided by locating the center of gravity of said airplane substantially aft thereof for providing a reasonably high unit lift on said controllable wing without longitudinal instability, the combination of said wing unit and said controllable wing producing non-stalling flight characteristics and giving full control in the usual stalling attitude of said airplane.

2. A heavier-than-air aircraft construction having a body member, and a combination of a fixed wing unit located toward the forward part of said body and a controllable wing unit composed of airfoil sections producing a substantially neutrally stable and unchanging center of pressure of air lift within normal range angles of attack; located toward the aft part of said body means for pivoting, said controllable wing about a lateral axis located substantially at the normal center of pressure of air lift thereof, means for varying the angle of incidence of said controllable wing by a rotational movement about said lateral axis for controlling the flight path of said aircraft, and means provided by said combined wing units for permitting the location of the center of gravity in a position relative to said fixed wing unit and said controllable wing such that the unit lift loading on said controllable aft wing is sufficiently smaller than that on said fixed wing unit to produce inherent longitudinal stability.

3. The combination, in an aircraft, of a fixed forward wing unit and a substantially neutrally stable aerodynamically efficient lifting element which constitutes a wing and a longitudinal control surface combined pivotally supported for movement about a lateral axis located substantially at the normal center of pressure of air lift and within a zone of neutral stability on said element, and means for controlling the longitudinal flight path of said aircraft by producing a rotational movement of said lifting element about said lateral axis to vary the angle of incidence of said element to increase or to decrease lifting effect thereof.

4. The combination in an airplane, of a fixed wing unit and a substantially neutrally stable elevator wing controllable about a lateral axis substantially located at the normal center of pressure of air lift, means for controlling the angle of incidence of said elevator wing about the said lateral axis so as to produce freely and rapidly longitudinal maneuvers with the said elevator wing chord line approximately tangent to the circumference of maneuver with the absence of retarding action of the usual horizontal tail surface.

5. A flying machine having, in combination, a body member, a control system a main wing unit supported from said body member, and a substantially neutrally stable control wing also supported from said body member for supporting a portion of the weight of said flying machine and for giving longitudinal stability and control, said control wing being pivoted on a lateral axis located in reference to the centers of pressure of resultant force at various flight attitudes that only light loads are produced in the control system.

6. An aircraft having a longitudinally stable and balanced combination of a fixed wing unit and a longitudinally separated substantially neutrally stable control wing unit pivoted for rotational movement within predetermined angular limits about a lateral axis located substantially within the zone of neutral stability, and longitudinal connecting members linking each of said wing units.

7. An aircraft having a longitudinally stable and balanced combination of a fixed wing unit and a substantially neutrally stable airfoil pivoted for rotational movement about a lateral axis located substantially within the range of the center of pressure travel in normal flight for giving easy longitudinal controllability and maneuverability and being separated longitudinally from said fixed wing unit, and connecting members between said fixed wing unit and said neutrally stable airfoil.

8. A heavier-than-air aircraft comprising a main wing unit, a lifting control wing having a substantially neutrally stable action of air forces at predetermined angles of attack and controllable rotationally about a lateral axis located substantially within the zone of neutral center of pressures of air and weight resultant force when said aircraft is flying at cruising speed and having unstable action of air forces at low angles of attack for automatically decreasing its angle of incidence and bringing said aircraft out of a dive and being located to the rear of said main wing, and longitudinal connecting members between said plurality of wings.

9. In a heavier-than-air aircraft construction, a body member, a main wing supported from the forward lower portion of the body member, and a longitudinally separated substantially neutrally stable wing supported from the body member and pivoted for rotational movement about an axis located substantially within the zone of neutral stability of the aft wing for controlling the flight path of the aircraft.

10. In combination with an aircraft, a fore and aft stabilizing surface comprising a pivoted control surface substantially neutrally stable at normal cruising speeds with a center of pressure of resultant force passing substantially through the pivot point at said cruising speeds and at higher speeds moving to one side of the pivot point.

11. In an airplane, having the center of gravity thereof substantially aft, connecting members, a main wing unit supported from the forward portion of said connecting members, and a longitudinally separated substantially neutrally stable aft wing laterally pivoted from said connecting members about an axis located substantially within the zone of neutral stability of said aft wing for carrying a portion of the useful load and controlling the longitudinal flight path of said airplane irrespective of excessive variation in position of the center of gravity tending to alter the normal stability and balance of said airplane.

12. In a heavier-than-air aircraft construction, a body, a main forward wing having angles of incidence varying progressively from a maximum at the wing root to a minimum at the wing tips for producing a flat burble point of the lift curve, and a substantially neutrally stable aft control wing element supported from the said body at a point above the projection of the mean aerodynamic chord line of the forward wing and above the turbulent downwash effect thereof for controlling the flight path of said aircraft by a rotational movement about an axis located substantially within the zone of neutral stability thereof.

13. In combination with an aircraft structure, a substantially neutrally stable longitudinally continuous elevating control surface controllable about a lateral axis located substantially within the zone of neutral stability of air and weight resultant force for giving an automatic balance with extreme variation in location and amount of the useful load of the said aircraft.

14. In a heavier-than-air aircraft, a body member, a main wing unit supported from the said body member, and a substantially neutrally stable controlling wing element supported upon said body member forward of the main wing unit and pivoted for motion about an axis located substantially within the zone of neutral stability thereof to control the flight path of said aircraft.

15. In an aircraft, a aircraft, a main wing unit supported aft of the center of gravity of said body member, and a substantially neutrally stable control wing element mounted from the forward portion of said body member about an axis located substantially within the zone of neutral stability thereof, and means for changing the angular position of said controllable wing element to control the flight path of said aircraft.

16. An aircraft comprising a horizontal airfoil having a substantially neutrally stable center of pressure of air force characteristics within a normal range of cruising speeds, and means for controlling said airfoil rotationally about a lateral axis located substantially where the moments of both air forces and structural weight are balanced and within a zone of neutral stability in the said range of cruising speeds for enabling said aircraft to fly normally a straight and steady course alone longitudinally entirely unaided and permitting rapid control for desired sudden changes in flight attitude.

17. The combination, in a heavier-than-air aircraft having its center of gravity located substantially aft, of a body member, a main wing unit supported from the forward portion of the body member, a substantially neutrally stable after controllable elevator wing unit pivotally supported from the body member about a lateral axis located substantially within the zone of neutral stability thereof, a large tail wheel carried upon the lower after portion of the body member for supporting a substantial portion of the weight of said aircraft in three point landing attitude, and means for controlling said controllable wing about said axis to produce upon landing a large negative movement of the angle of incidence and negative air load on said controllable elevator wing to produce an air drag to shorten the landing run of the aircraft.

18. A tandem airplane having, in combination, a main wing unit, and a substantially neutrally stable control wing controllable about a lateral axis located substantially within the zone of neutral stability, and connecting members longitudinally separating the said combination of wings and producing the strong longitudinal stability of fixed tandem airplanes with extreme ease of longitudinal control and maximum of longitudinal maneuverability.

19. In an airplane construction, a fuselage, a fixed wing unit located forward on said fuselage, said wing unit having a stable center of pressure motion of air lift with a flat burble point at an angle of maximum lift, a controllable wing located aft of said fixed wing unit and supported from said fuselage, means for pivoting said aft located wing about an axis located at the normal center of pressure of said wing, said aft wing being arranged with a neutrally stable center of pressure motion resultant force within a relatively small range of the normal angle of attack, and an unstable center of pressure motion at extreme angles of attack, means for controlling the motion of said pivoted aft wing about said axis thereof, and means provided by locating the center of gravity of said airplane substantially aft thereof for providing a reasonably high unit lift on said controllable wing while maintaining longitudinal stability, the combination of said flat burble point and said controllable wing producing non-stalling flight characteristics of said airplane.

20. An aircraft having a longitudinally stable and balanced combination of a fixed main biplane wing unit and a substantially neutrally stable control wing unit pivoted for rotational movement within predetermined angular limits about a lateral axis located within the zone of neutral stability thereof, and longitudinal connecting members linking and longitudinally separating each of the wing units.

21. A tandem monoplane having, in combination, a body member, a control system, a main wing supported from the body member, and a substantially neutrally stable control wing also supported from the body member for supporting a portion of the weight of the monoplane and for giving longitudinal stability and control, the control wing being pivoted on a lateral axis so located in reference to the centers of pressure of resultant force at various flight attitudes that only light loads are produced in the control system.

22. The combination, in a flying machine, of a fixed wing unit and a substantially neutrally stable elevator control surface unit controllable about a lateral axis located substantially at the normal center of pressure of resultant force, means for controlling the angle of incidence of the elevator control surface about the lateral axis so as to produce freely and rapidly longitudinal maneuvers with the absence of the retarding action of the usual horizontal empennage.

23. An aircraft having a longitudinally stable and balanced combination of a fixed staggered decalage main biplane wing unit and a substantially neutrally stable control wing unit pivoted for rotational movement within predetermined limits about a lateral axis located substantially within the zone of neutral stability thereof, and longitudinal connecting members linking and longitudinally separating each of the wing units.

24. A flying machine having, in combination, a body member, a main wing unit supported from the body member, a control system, and a control wing substantially neutrally stable at normal cruising speeds also supported from the body member for giving longitudinally stability and control, said control wing being pivoted on a lateral axis so located in reference to the center of pressure of resultant force at various flight attitudes that light loads only are produced in the control system.

25. A flying machine having a longitudinally stable and balanced combination of a fixed wing unit and a fore and aft control wing substantially neutrally stable at normal cruising speeds and controllable about a lateral axis located substantially within the zone of neutral stability for giving easy longitudinal controllability and maneuverability, and connecting members for supporting and longitudinally separating the fixed wing unit and the neutrally stable control wing.

26. A heavier-than-air aircraft comprising a body member, a main wing unit supported from the body member, a longitudinal control wing having a substantially neutrally stable action of air forces within the range of cruising speeds carried by the body member in a longitudinally separated position from the main wing unit, and means for rotationally controlling the control wing about a lateral axis located substantially within the range of center of pressure travel of resultant force in the range of cruising speeds, said control wing having an unstable action of air forces at maximum and minimum speeds of the aircraft for automatically changing the angle of incidence so as to bring the aircraft back to the range of cruising speeds.

27. An aircraft having a longitudinally stable and balanced combination of a main wing element, a body member for supporting the main wing element, and a single longitudinally and transversely continuous substantially neutrally stable control wing also supported from the body member and separated longitudinally from the main wing unit by the body member, and means for pivoting the control wing for rotational movement within predetermined angular limits about a lateral axis located within the zone of neutral stability thereof.

28. In combination with an aircraft structure, a body member, a pair of simultaneously acting substantially neutrally stable control elements carried by the body member and separated from each other by the width of the body member at the point of support, means for pivoting the control elements for simultaneous rotation within predetermined angular limits about a shaft extending through the body member and located substantially within the zone of neutral stability of each control element so as to control the flight path of the aircraft, and a main wing element also carried by the body member and longitudinally separated from the neutrally stable control surfaces.

29. In a heavier-than-air aircraft, a connecting unit, a main wing unit supported from the forward portion of the connecting unit, a tail landing support unit, and a longitudinally separated aft control wing unit substantially neutrally stable within a normal range of cruising speeds and laterally pivoted from the connecting unit about an axis located substantially within the zone of neutral stability in normal flight for lifting a portion of the loaded weight of the aircraft in flight and substantially reducing this lift upon landing the aircraft to produce a substantial weight on the tail landing support unit for an effective braking action thereof.

30. A flying machine comprising, in combination, a body member, a main wing unit supported from the body member, and a flight controlling wing element substantially neutrally stable at normal cruising speeds also supported from the body member in longitudinally spaced relationship with respect to the main wing unit and located above the turbulent downwash effect thereof.

DONALD A. HALL.